May 19, 1931. R. M. WOOD 1,806,379
WINGS AND OTHER AEROFOILS OF AIRCRAFT
Filed Jan. 23, 1928   5 Sheets-Sheet 1
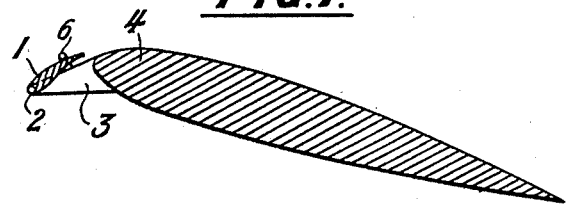
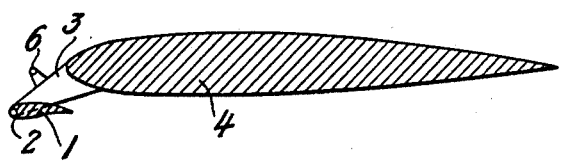
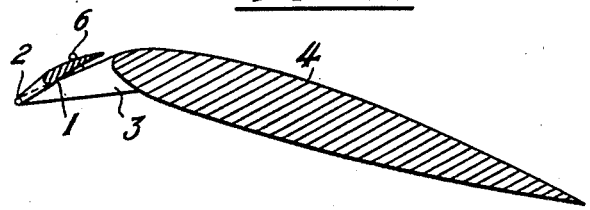
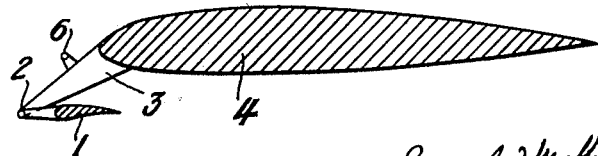
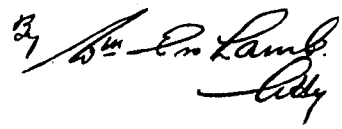

May 19, 1931. R. M. WOOD 1,806,379
WINGS AND OTHER AEROFOILS OF AIRCRAFT
Filed Jan. 23, 1928   5 Sheets-Sheet 2

Ronald McKinnon Wood
Inventor.

May 19, 1931. R. M. WOOD 1,806,379
WINGS AND OTHER AEROFOILS OF AIRCRAFT
Filed Jan. 23, 1928 5 Sheets-Sheet 3
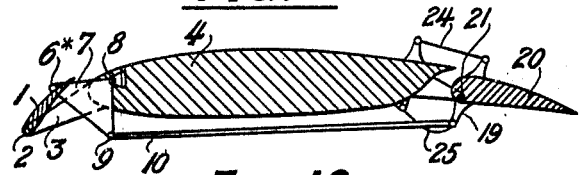
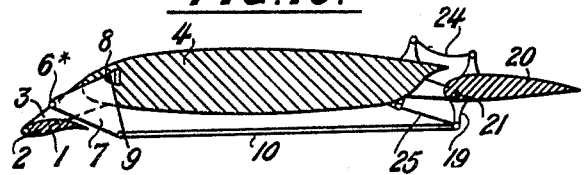
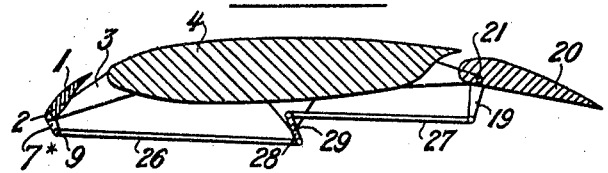
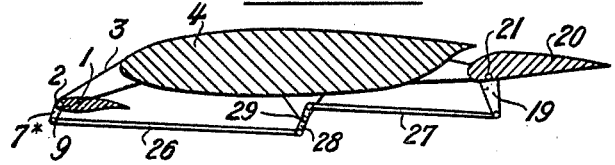
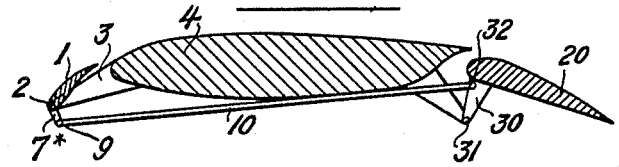
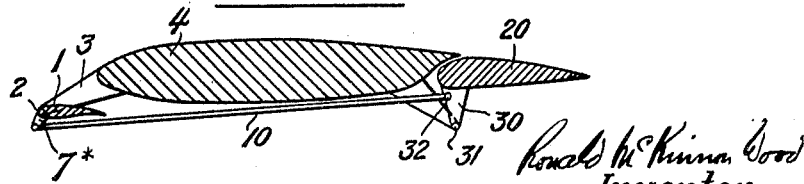

May 19, 1931.   R. M. WOOD   1,806,379
WINGS AND OTHER AEROFOILS OF AIRCRAFT
Filed Jan. 23, 1928   5 Sheets-Sheet 4
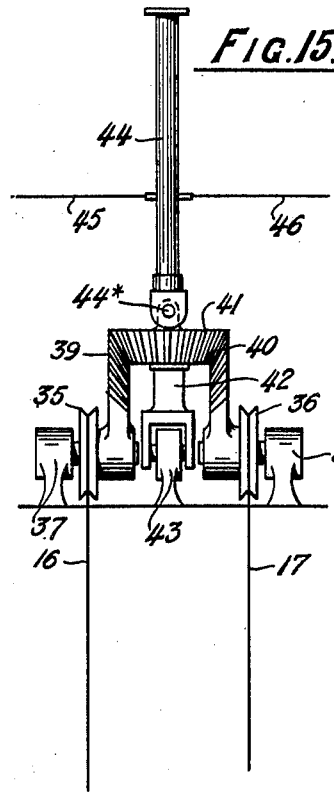
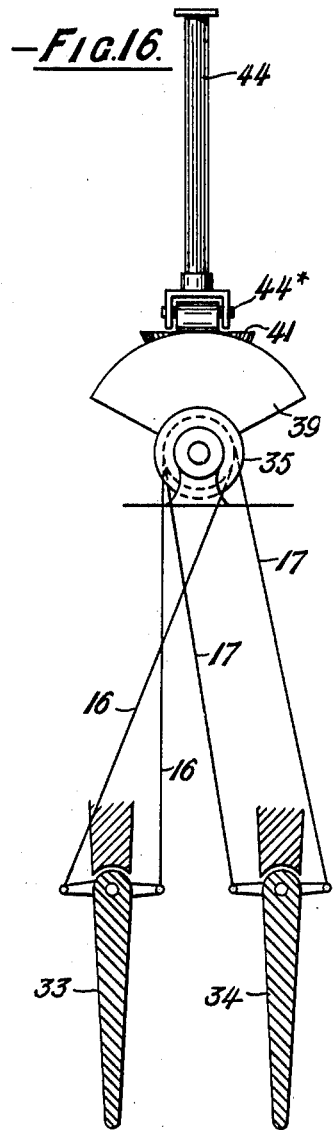
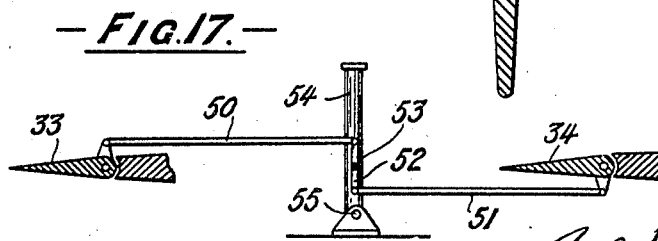

May 19, 1931.　　　R. M. WOOD　　　1,806,379
WINGS AND OTHER AEROFOILS OF AIRCRAFT
Filed Jan. 23, 1928　　5 Sheets-Sheet 5
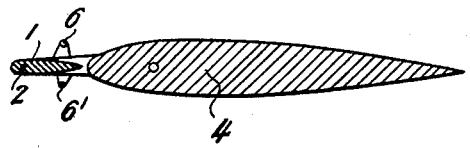
—FIG.18.—
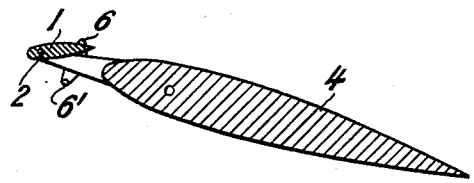
—FIG.19.—
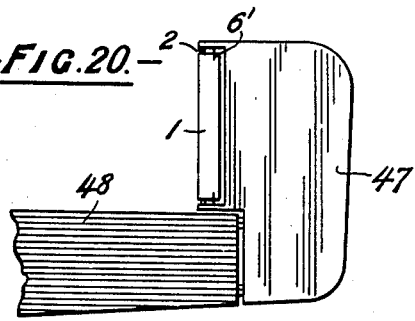
—FIG.20.—
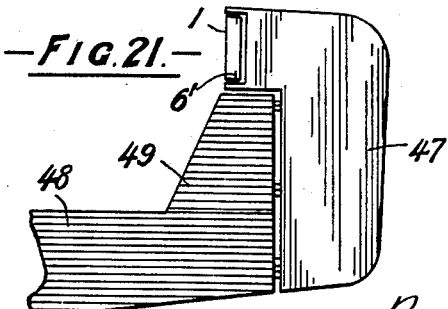
—FIG.21.—
Ronald McKinnon Wood
Inventor.

Patented May 19, 1931

1,806,379

UNITED STATES PATENT OFFICE

RONALD McKINNON WOOD, OF SOUTH FARNBOROUGH, ENGLAND, ASSIGNOR TO HANDLEY PAGE LIMITED, OF CRICKLEWOOD, MIDDLESEX, ENGLAND

WINGS AND OTHER AEROFOILS OF AIRCRAFT

Application filed January 23, 1928, Serial No. 248,920, and in Great Britain January 25, 1927.

This invention relates to wings of aircraft which in normal flight are flown at a positive angle of incidence. The invention is also applicable to other surfaces as hereinafter described.

It is known that the angle of incidence at which breakdown of the steady flow of air over the upper surface of a wing occurs may be increased—with a consequent increase of lift for a given speed of flight—by the provision of a suitably shaped rearwardly inclined passage or slot through which air can flow from the under surface to the upper surface of the wing. A wing with such a passage may be formed by the combination of a relatively small auxiliary aerofoil of wing section arranged with its trailing edge above the leading edge of a relatively large main aerofoil of wing section.

The slotted construction has the disadvantage that it causes high drag at small angles of incidence of the wing. In some arrangements the slot is set open, and in other arrangements the slot may be closed by the pilot by turning the auxiliary aerofoil so that its trailing edge bears against the upper surface of the main aerofoil, or by moving the auxiliary aerofoil so that its under surface lies snug against the upper surface of the main aerofoil, the whole presenting a low drag form. The latter method has the smaller drag at small angles of incidence of the wing.

The present invention has for its main object to obtain the advantage of what is known as a slotted wing without high drag at small angles of incidence and with automatic operation.

An effective means or passage for delaying the breakdown of the steady flow of air over the upper surface of a relatively large main aerofoil may be provided by a relatively small pilot plane set in front of the main aerofoil in such a position that if the pilot plane could be rotated through 360° about an axis near its leading edge it would not make contact with the main aerofoil.

According to the present invention the wing consists of the combination of a pilot plane mounted in position in front of a main fixed aerofoil as described in the preceding paragraph but free to be automatically rotated, except that upward movement of the trailing edge of the pilot plane is limited by a stop to a position in which the pilot plane is effective in increasing the maximum lift for a given speed of flight. The pilot plane otherwise tends automatically to lie approximately along the direction in which the air would flow if the pilot plane were not present, without the pilot having to move the pilot plane by hand. The pilot plane should be so shaped as to conform to the air flow when the main aerofoil is at small angles of incidence so far as is consistent with the formation of an effective slot at high angles of incidence of the main aerofoil.

In the flight of an aeroplane provided with wings constructed according to the present invention, at maximum speed the pilot plane in each wing will lie with its trailing edge below the leading edge of the main aerofoil, and the trailing edge of the pilot plane will rise as the positive angle of incidence of the main aerofoil is increased. When the trailing edge of the pilot plane is below the leading edge of the main aerofoil an air flow passage is formed between the upper surface of the trailing part of the pilot plane and the under surface of the leading part of the main aerofoil, and when the trailing edge of the pilot plane is above the leading edge of the main aerofoil an air flow passage is formed between the trailing part of the pilot plane and the upper surface of the leading part of the main aerofoil and is effective in delaying the breakdown of the steady flow of air over the upper surface of the main aerofoil if the upward movement of the trailing edge of the pilot plane is suitably restricted.

In carrying out the invention, the pilot plane is pivotally mounted along or adjacent to its leading edge on brackets or rib extensions projecting forwardly from the leading edge of the main aerofoil, so that the trailing edge of the pilot plane may swing up and down above and below the leading extremity of the leading edge of the main aerofoil, with a small clearance between the trailing edge of the pilot plane and the leading edge of the main aerofoil when in their nearest positions. The stops may be fixed on the brackets.

The position of the pivot axis of the pilot plane relative to the main aerofoil and the position of the stop require to be determined by experiment in order to secure the best results, and will vary according to the cross section form of the main aerofoil. Speaking generally, the pivot axis of the pilot plane is below the plane containing the leading and trailing edges of the main aerofoil.

The pilot plane may be of wing cross section, and the limit of upward movement of its trailing edge at large angles of incidence of the main aerofoil may be such that its chord lies in a line slightly outside the upper surface of the main aerofoil. The ratio of the length of the chord of the pilot plane to the length of the chord of the main aerofoil may be of the order of 1 to 10. The figures mentioned are only given by way of example, and may be varied without departing from the nature of the invention.

The following applications of the invention are mentioned by way of example:—

The pilot plane may be fitted along the whole length of a main aerofoil to increase the maximum lift for a given speed.

The pilot plane may be fitted in front of part only of a main aerofoil, for example, at the tips to reduce or avoid instability of flight when the aerofoil has passed the angle of incidence of greatest lift at given speed, or, in other words, to reduce or prevent the autorotative tendency of a stalled wing, and to increase the efficiency of ailerons at large angles of incidence of the main aerofoil.

Further according to the invention, when pilot planes are fitted to main aerofoils having aileron control, the stops limiting the upward movement of the trailing edges of the pilot planes may be adjustable and interconnected with the ailerons on the main aerofoils, so that when the pilot planes are bearing against the stops the width of the passage varies as the ailerons are rotated and move the stops, the width of the passage being either decreased or increased on that wing on which the trailing edge of the aileron is raised, and conversely, or simply decreased or increased on that wing on which the aileron is raised. This arrangement provides an additional means of securing lateral balance of the aeroplane when stalled.

The gearing between the pilot planes and the ailerons may vary with the position of the ailerons so that, for equal upward and downward movements of the trailing edge of the aileron, the angular movement permitted to the pilot plane may be different.

Further, according to the present invention, a wing or the like consists of the combination of a pilot plane freely pivoted in front of a main aerofoil as above mentioned, the main aerofoil comprising a forward portion which is fixed to the fuselage and a rearward portion (hereinafter called a flap) which is freely pivoted on the fixed portion, the flap being interconnected with the pilot plane in such a way that upward movement of the trailing edge of the pilot plane causes downward movement of the trailing edge of the flap.

The interconnection of the pilot plane and the flap may be such that, as the trailing edge of the pilot plane rises the downward movement of the trailing edge of the flap does not begin until the pilot plane approaches that position which is most effective for delaying stalling or the breakdown of a steady flow of air over the upper surface of the main aerofoil. This result may be obtained by interconnecting the pilot plane stop and the flap. In an alternative arrangement in which the pilot plane and the flap move in unison they are permanently connected together.

Rotation of the pilot plane and of the flap may be limited by checkwires or other means to those respective positions which are most effective for obtaining a high maximum lift at a given speed, and to those respective positions most suitable for low drag at high speed or for securing a desired position of the centre of lift of the whole wing.

The flap may be pivotally mounted at or behind its leading edge and the two portions of the main aerofoil (i. e. the fixed portion and the flap) may be so shaped that a converging and rearwardly inclined passage is formed between the adjacent parts of the main aerofoil for air to flow through from the under surface to the upper surface of the main aerofoil in order to prevent the air flow from breaking away from the upper surface of the flap when the flap is automatically depressed at large angles of incidence of the fixed portion of the main aerofoil.

It will be seen that in wings provided with pilot planes and flaps according to the present invention the slots in the wings and the camber of the wings are automatically controlled.

Lateral control of the aircraft may be obtained without preventing the automatic change of camber of the whole wing, by the use of differential gear or other suitable gear arranged so that lateral movement of the control column causes the whole or a part of the flaps on the opposite wings to move in opposite directions, while allowing them complete freedom to move together.

The pilot plane and/or the flap may extend along the whole or part of the length of the main aerofoil.

In a modification of the invention, a pilot plane of symmetrical cross section is pivotally mounted in front of, and in the median plane of, a main aerofoil of symmetrical section, so that a slot for delaying the breakdown of steady air flow over one or the other surface of the main aerofoil is formed according to which side of the main aerofoil the air flow impinges on. In such an arrangement, stops are provided for limiting the angular movement of the pilot plane relative to the main aerofoil in both directions or senses. Such an arrangement is particularly applicable for increasing the maximum effectiveness of controlling or stabilizing surfaces, such as rudders and the like, and of the balance portions of control surfaces.

Various arrangements of automatic pilot plane mounted in front of a main plane or other surface according to the present invention are illustrated, diagrammatically and by way of example, in the accompanying drawings, in which:—

Figs. 1 and 2 are transverse views, respectively at relatively large and relatively small angles of incidence of the main plane, showing the pilot plane mounted at its leading edge;

Figs. 3 and 4 are similar views showing the pilot plane mounted in front of its leading edge;

Figs. 8 to 14 are transverse views showing the pilot plane interconnected with a flap;

Figs. 15 and 16 are views at right angles to one another, and Fig. 17 is an elevation, of control column gears for moving ailerons in opposite directions while allowing them freedom to move together;

Figure 5:
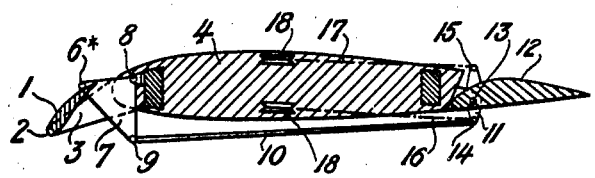
Figs. 5, 6 and 7 are transverse views showing the pilot plane interconnected with an aileron.

Figs. 18 and 19 are transverse views showing a pilot plane of symmetrical section pivotally mounted in front of a main aerofoil of symmetrical section; and Figs. 20 and 21 are elevations showing the arrangement represented in Figs. 18 and 19 applied to rudders of different forms.

Like reference numbers indicate similar parts wherever repeated in the drawings.

In the constructions shown in Figs. 1 and 2, and 5 to 14, the pilot plane 1 is pivotally mounted, as at 2, along its leading edge, on brackets or ribs 3 projecting from the main aerofoil 4; in Figs. 3 and 4 the pilot plane is pivotally mounted, as at 2, in front of its leading edge on brackets 3; and in Figs. 18 to 21 the pilot plane is pivotally mounted, as at 2, behind its leading edge on brackets 3.

In Figs. 1 to 4, a stop 6 for limiting the upward movement of the trailing edge of the pilot plane is fixed on the bracket 3. In Figs. 5 to 10 an adjustable stop 6× for limiting the upward movement of the trailing edge of the pilot plane is shown. In Figs. 18 to 21 fixed stops 6, 6¹ limit the movement of the pilot plane in both directions.

The various arrangements illustrated in the drawings will now be more particularly described.

Referring to Figs. 1 and 2, a pilot plane 1 is pivotally mounted along its leading edge, at 2, on brackets 3, at the ends of or at intermediate positions along the leading edge of the main aerofoil 4, so that the trailing edge of the pilot plane can swing past the leading edge of the main aerofoil. The upward movement of the pilot plane is limited by one or more stops 6 fixed on the brackets 3. In Fig. 2, the pilot plane is shown in a position which it automatically assumes at fine angles of incidence of the main aerofoil, and it will be noted that in such a position the pilot plane is free to move without the pilot having to control the pilot plane by hand. In Fig. 1 the pilot plane is shown in the position where it presses against the stop 6, when the incidence of the main aerofoil is large. The stop is so arranged that the pilot plane assumes this position when its trailing edge is moving upwards before the main aerofoil assumes a position in which it would stall in the absence of the pilot plane. In all positions other than that shown in Fig. 1, the pilot plane is free to move as above mentioned. The most effective position of the pilot plane for delaying the breakdown of the steady flow of air over the upper surface of the main aerofoil is where it is pressed against the stop as shown in Fig. 1. The most effective positions of the pilot plane for offering a small drag are where the pilot plane is free, not pressed against the stop, and is angularly adjusted automatically in both the upward and the downward directions by the air flow as shown in Fig. 2, in positions below that shown in Fig. 2 and in intermediate positions between those shown in Figs. 1 and 2. The arrangement is, therefore, of advantage in comparison with previous slotted wing arrangements constructed for the purpose of delaying a breakdown of the steady flow of air over the upper surface of a main aerofoil in that the operation of the pilot plane is entirely automatic in so far as manual operation by the pilot is concerned, and in that the pilot plane offers a minimum drag at all small angles of incidence of the main aerofoil and becomes effective for obtaining the advantages of a slotted wing when the main aerofoil is approaching its stalling angle of incidence.

Referring to Figs. 3 and 4, the pilot plane is pivotally mounted in front of its leading edge, as at 2, instead of along its leading edge as shown in Figs. 1 and 2, and the brackets 3 which support the pilot plane are made longer than those shown in Figs. 1 and 2. Otherwise, the arrangement shown in Figs. 3 and 4 is similar to that shown in Figs. 1 and 2, Fig. 3 showing the extreme upward position of the pilot plane relative to the main aerofoil, and Fig. 4 showing a position of the pilot plane at a fine angle of incidence of the main aerofoil.

Referring to Fig. 5, the pilot plane is pivotally mounted as in Figs. 1 and 2, and a stop 6ˣ is carried on one arm of a bellcrank lever 7, which is fulcrummed at 8 on the front spar or other other convenient part of the main aerofoil 4. The stop 6ˣ preferably takes the form of a roller, or small wheel mounted on an axle projecting from the said bellcrank lever. The other arm of the bellcrank lever is pivotally connected at 9 to one end of a connecting rod 10 which is pivotally connected at its other end to a lever 11 on an aileron 12 pivotally mounted at 13 at the trailing part of the main aerofoil. The aileron is connected at 14, 15 to aileron control wires 16, 17 under the control of the pilot in any usual or convenient manner. 18 are guide pulleys. With this arrangement, the automatic operation of the pilot plane is similar to that described with reference to Figs. 1 and 2, excepting that the stop, instead of being fixed, can be adjusted in position relative to the main aerofoil and is adjusted in position at the same time as the aileron is adjusted in position through the interconnection of the rod 10. It will be seen that as the trailing edge of the aileron is depressed and its incidence is made more positive, the angle through which the trailing edge of the pilot plane may be swung upwards is increased.

Figure 6:
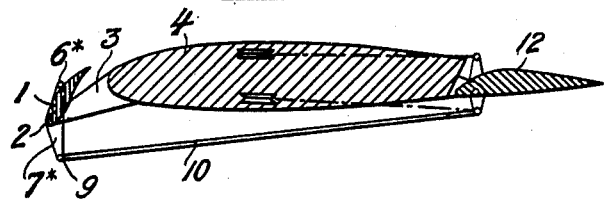

Referring to Fig. 6, a similar arrangement to that shown in Fig. 5, is illustrated, excepting that a lever 7ˣ is employed (instead of the bellcrank lever 7), and the lever 7ˣ is fulcrummed on the brackets 3 instead of on the front spar of the main aerofoil). The lever 7ˣ is so arranged that as the trailing edge of the aileron is depressed, the angle through which the trailing edge of the pilot plane may swing upwards is decreased.

Figure 7:
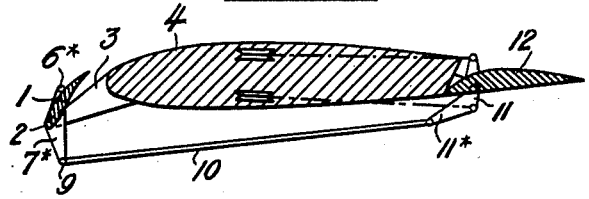

Referring to Fig. 7 a similar arrangement to that shown in Fig. 6 is illustrated, excepting that the lever 11 on the aileron is formed with a branch 11ˣ, which is so disposed that for equal upward and downward movements of the trailing edge of the aileron, unequal movements are imparted to the stop. With this arrangement, a given upward angular movement of the trailing edge of the aileron from its neutral position produces a larger angular movement of the stop than is imparted to the latter by an equal downward movement of the trailing edge of the aileron from its neutral position.

The arrangements shown in Figs. 5 to 7 may be employed with ailerons pivoted at their leading edges, or with balanced ailerons pivoted behind their leading edges.

Figure 8:
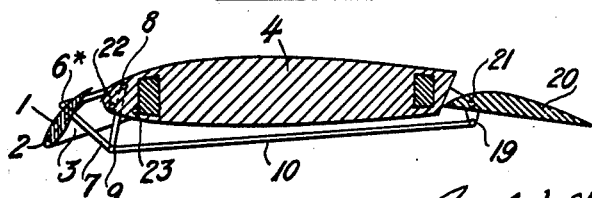

Referring to Fig. 8, the pilot plane is pivotally mounted at its leading edge and the stop 6ˣ is carried on a bellcrank lever 7 as in Fig. 5, but (instead of being connected to an aileron) the bellcrank lever is coupled by a connecting rod 10 to a lever 19 on a flap 20, which is pivotally mounted at 21 at the trailing part of the main aerofoil. The bellcrank lever 7 has its upward and downward movements limited by abutments 22, 23 so that the upward and downward movements of the flap are limited. Otherwise, the flap is free to be moved by the air flow past the main aerofoil and will normally have its trailing edge in the uppermost position. With this arrangement upward movement of the trailing edge of the pilot plane after impinging on the stop moves the stop so as to allow of increased downward angular movement of the trailing edge of the flap.

Referring to Figs. 9 and 10, an arrangement similar to that shown in Fig. 8 is illustrated, excepting that (instead of the abutments 22, 23) checkwires 24, 25 are employed for limiting the upward and downward movements of the flap which controls the position of the stop 6ˣ.

Referring to Figs. 11 and 12 the pilot plane is pivoted at its leading edge and is coupled by means of a lever extension 7ˣ, two connecting rods 26, 27, and an intermediate reversing lever 28 pivoted at 29 on the main aerofoil, to a lever 19 on a flap 20, which is pivotally mounted as at 21 at the trailing part of the main aerofoil. With this arrangement upward movement of the trailing edge of the pilot plane moves the trailing edge of the flap downwards.

Referring to Figs. 13 and 14, the pilot plane is pivoted at its leading edge and is coupled by means of a lever extension 7ˣ and a connecting rod 10 to a lever 30 carrying a flap 20. The lever 30 is fulcrumed at 31 at the trailing part of the main aerofoil and is pivotally connected at 32 to the connecting rod. With this arrangement upward movement of the trailing edge of the pilot plane moves the trailing edge of the flap downwards.

The flap may be of such a kind as to leave a slot permanently open between its leading edge and the trailing edge of the main aerofoil as in Figs. 9 to 12, or of such a kind as to close such a slot when the trailing edge of the flap is raised as in Figs. 13 and 14.

In the various arrangements wherein a flap is employed, the camber of the wing is automatically changed.

In the arrangements wherein the upward movement of the trailing edge of the pilot plane is not limited to a fixed position relative to the main aerofoil, advantage may be taken of the fact that movement of the trailing edge of the pilot plane upon one or other side of its most effective position for delaying the breakdown of steady air flow over the upper surface of the main aerofoil may be employed in obtaining the desired improvement in lateral balance or control.

It will be understood that the ailerons or flaps described are employed on opposite sides of the aircraft.

Although the pilot plane has been illustrated as applied to main aerofoils of a particular section, it will be understood that it may be applied to main aerofoils of other sections. Further, the pilot plane may be made of other sections than those illustrated, for example, the pilot plane may be made of symmetrical section.

Referring to Figs. 15 and 16 an arrangement of aileron control is illustrated by which lateral control may be obtained, without preventing automatic change of camber of the wing. In this arrangement two ailerons or flaps 33, 34 are connected by control wires 16, 17 passing over two grooved wheels 35, 36 respectively. The wheels are rotatably mounted on bearings 37, 38, and carry bevel quadrants 39, 40 which mesh with a bevel wheel 41 rotatably mounted on a shaft 42. The shaft 42 is pivoted coaxially with the quadrants, on a bearing 43. The shaft 42 is connected to a control column 44, so that when the control column is moved in the athwart-ship plane, as indicated by the arrows in Fig. 16, both quadrants are rotated by the bevel wheel and both ailerons are operated. In order to make the ailerons on opposite sides of the aircraft move simultaneously in opposite senses or directions, the control wires of one aileron are crossed. When the control column is held stationary so as to hold the shaft 42 stationary the ailerons are free to rotate in the same sense.

The control column may be pivoted about an axis 44ˣ at right angles to the axis of the bearing 43 to allow the operation of elevators by wires 45, 46. A reversing lever pivoted upon a movable fulcrum carried by the control column and coupled to the ailerons may be used to achieve the objects of the arrangements shown in Figs. 15 and 16. For example, as shown in Fig. 17 the ailerons 33 and 34 are connected by rods 50 and 51 to a lever 52 fulcrummed at 53 upon the control column 54 which is fulcrummed at 55. If the control column is held fixed the ailerons are free to rotate in the same sense, and if the control column 54 is rotated about the fulcrum 55 the ailerons are caused to rotate in opposite senses.

Referring to Figs. 18 and 19, a pivot plane 1 of symmetrical section is shown pivotally mounted at 2 in front of and in the median plane of a main aerofoil 4 of symmetrical section, and stops 6, 6¹ are shown for limiting the angular movement of the pilot plane in each direction. With this arrangement, a rearwardly directed slot is automatically formed between the pilot plane and one or the other surface of the main aerofoil according to the angle of incidence of the main aerofoil to the relative wind. The slot directs the air flow to the surface of the main aerofoil which is on the opposite side to that on which the air flow impinges. In all positions of the pilot plane wherein it is not pressed by the air flow against one or the other of the stops, the pilot plane offers a minimum drag, while the pilot plane becomes most effective in delaying breakdown of the air flow over the respective surface of the main aerofoil when the pilot plane is pressed against one or the other of the stops.

The pilot plane, in such an arrangement as just described, is preferably pivoted at a point distant about one fifth of its chord behind its leading edge.

Referring to Figs. 20 and 21, a pilot plane 1 as shown in Figs. 18 and 19 is represented applied to a rudder 47, which is hinged on the fuselage 48 of an aircraft. In these constructions the pilot plane is pivotally mounted in front of the leading edge of a balance portion of the rudder. In Fig. 20 no fin is employed, and in Fig. 21 a fin 49 is shown to which the rudder is hinged.

What I claim as my invention and desire to secure by Letters Patent is:—

1. In association with a main aerofoil adapted to advance through the air at various angles of incidence, brackets projecting forward from such main aerofoil adapted to support pivots, a pilot plane pivoted near its leading edge on such pivots and adapted to rotate under the influence of the air about the axis of said pivots, the trailing edge of such pilot plane being free to pass to either side of the leading edge of said main aerofoil, and means adapted to limit the angular movement of the said pilot plane to such an angle relatively to the said main aerofoil that when restrained by said means the said pilot plane directs a flow of air over that surface of the main aerofoil most remote from the direction of the air flow into which the said main aerofoil is advancing.

2. In association with a wing comprising a main aerofoil adapted to advance through the air at various angles of incidence, brackets projecting forward from such main aerofoil adapted to support pivots, a pilot plane pivoted near its leading edge on such pivots and adapted to rotate under the influence of the air about the axis of said pivots the trailing edge of such pilot plane being free to pass to either side of the leading edge of said main aerofoil, and stops adapted to limit the upward angular movement of the said pilot plane to such an angle relatively to the said main aerofoil that when restrained by said stops the said pilot plane directs a flow of air over the upper surface of the main aerofoil.

3. In association with a wing comprising a main aerofoil adapted to advance through the air at various angles of incidence, brackets projecting forward from such main aerofoil adapted to support pivots, a pilot plane pivoted near its leading edge on such pivots and adapted to rotate under the influence of the air about the axis of said pivots the trailing edge of such pilot plane being free to pass to either side of the leading edge of said main aerofoil, stops adapted to limit the upward angular movement of the said pilot plane to such an angle relatively to the said main aerofoil that when restrained by said stops the said pilot plane directs a flow of air over the upper surface of the main aerofoil, adjustable means for carrying such stops and mechanical means connecting a rearwardly extending adjustable control surface with the said adjustable means, both of the latter, adapted to adjust the stops in such a manner that the upward adjustment of the pilot plane remains in accord with the position of the said rearwardly extending control surface.

4. In association with a wing comprising a main aerofoil adapted to advance through the air at various angles of incidence, brackets projecting forward from such main aerofoil adapted to support pivots, a pilot plane pivoted near its leading edge on such pivots and adapted to rotate under the influence of the air about the axis of said pivots the trailing edge of such pilot plane being free to pass to either side of the leading edge of said main aerofoil, stops adapted to limit the upward angular movement of the said pilot plane to such an angle relatively to the said main aerofoil that when restrained by said stops the said pilot plane directs a flow of air over the upper surface of the main aerofoil, a lever adapted to carry such stops, stationary pivots supporting such lever, and mechanical means connecting a rearwardly extending adjustable control surface with said lever, both of the latter adapted to adjust the stops in such a manner that the upward adjustment of the pilot plane remains in accord with the position of the said rearwardly extending control surface.

5. In association with a wing comprising a main aerofoil adapted to advance through the air at various angles of incidence, brackets projecting forward from such main aerofoil adapted to support pivots, a pilot plane pivoted near its leading edge on such pivots and adapted to rotate under the influence of the air about the axis of said pivots the trailing edge of such pilot plane being free to pass to either side of the leading edge of said main aerofoil, stops adapted to limit the upward angular movement of the said pilot plane to such an angle relatively to the said main aerofoil that when restrained by said stops the said pilot plane directs a flow of air over the upper surface of the main aerofoil, a bell crank lever adapted to carry such stops, stationary pivots supporting such bell crank lever and mechanical means connecting a rearwardly extending adjustable control surface with said bell crank lever, both of the latter adapted to adjust the stops in such a manner that the upward adjustment of the pilot plane remains in accord with the position of the said rearwardly extending control surface.

6. In association with a wing comprising a main aerofoil adapted to advance through the air at various angles of incidence, brackets projecting forward from such main aerofoil adapted to support pivots, a pilot plane pivoted near its leading edge on such pivots and adapted to rotate under the influence of the air about the axis of said pivots the trailing edge of such pilot plane being free to pass to either side of the leading edge of said main aerofoil, stops adapted to limit the upward angular movement of the said pilot plane to such an angle relatively to the said main aerofoil that when restrained by said stops the said pilot plane directs a flow of air over the upper surface of the main aerofoil, a bell crank lever adapted to carry such stops, stationary pivots supporting such bell crank lever and links connecting a rearwardly extending adjustable control surface with said bell crank lever, both of the latter adapted to adjust the stops in such a manner that the upward adjustment of the pilot plane remains in accord with the position of the said rearwardly extending control surface.

7. In association with a wing comprising a main aerofoil adapted to advance through the air at various angles of incidence, brackets projecting forward from such main aerofoil adapted to support pivots, a pilot plane pivoted near its leading edge on such pivots and adapted to rotate under the influence of the air about the axis of said pivots the trailing edge of such pilot plane being free to pass to either side of the leading edge of said main aerofoil, stops adapted to limit the upward angular movement of the said pilot plane to such an angle relatively to the said main aerofoil that when restrained by said stops the said pilot plane directs a flow of air over the upper surface of the main aerofoil, a bell crank lever adapted to carry such stops, stationary pivots supporting such bell crank lever, links connecting a rearwardly extending adjustable control surface with said bell crank lever, both of the latter adapted to adjust the stops in such a manner that the upward adjustment of the pilot plane remains in accord with the position of the said rearwardly extending control surface, and stationary stops adapted to limit the throw of such bell crank lever.

8. In association with a wing comprising a main aerofoil adapted to advance through the air at various angles of incidence, brackets projecting forward from such main aerofoil adapted to support pivots, a pilot plane pivoted near its leading edge on such pivots and adapted to rotate under the influence of the air about the axis of said pivots the trailing edge of such pilot plane being free to pass to either side of the leading edge of said main aerofoil, a rearwardly extending freely pivoted flap located on the rear portion of the main aerofoil, and pivoted connecting means between the pilot plane and the flap adapted to transmit angular movement between the said pilot plane and the flap.

9. In association with wings comprising main aerofoils adapted to advance through the air at various angles of incidence and provided with pilot planes located in advance of each wing such pilot planes being in operative connection with the control surfaces on the trailing portions of such wings, differential gearing on the aircraft adapted to permit the pilot planes and control surfaces to move in unison whilst permitting of operable control being given to such control surfaces from a control column.

In witness whereof I have hereunto set my hand.

RONALD McKINNON WOOD.